(12) United States Patent
Nang et al.

(10) Patent No.: US 8,440,847 B2
(45) Date of Patent: May 14, 2013

(54) METHOD OF CONVERTING FREE FATTY ACID (FFA) FROM OIL TO METHYL ESTER

(75) Inventors: Harrison Lau Lik Nang, Selangor Darul Ehsan (MY); Nur Sulihatimarsyila Bt. abd. Wafti, Selangor Darul Ehsan (MY); Choo Yuen May, Selangor Darul Ehsan (MY); Mohd. Basri B. Wahid, Selangor Darul Ehsan (MY)

(73) Assignee: Malaysian Palm Oil Board (MPOB), Kajang (MY)

( * ) Notice: Subject to any disclaimer, the term of this patent is extended or adjusted under 35 U.S.C. 154(b) by 290 days.

(21) Appl. No.: 12/893,085

(22) Filed: Sep. 29, 2010

(65) Prior Publication Data

US 2011/0105775 A1    May 5, 2011

(30) Foreign Application Priority Data

Oct. 29, 2009    (MY) ............................... PI 20094565

(51) Int. Cl.
*C11C 3/00*    (2006.01)
(52) U.S. Cl.
USPC ....................................... 554/167

(58) Field of Classification Search ................... 554/167
See application file for complete search history.

(56) References Cited

U.S. PATENT DOCUMENTS

| 6,965,044 | B1 | 11/2005 | Hammond et al. |
| 7,256,301 | B2 | 8/2007 | Erguen et al. |
| 7,700,793 | B2 * | 4/2010 | Iyer ............................... 554/174 |
| 2006/0293533 | A1 | 12/2006 | Iyer |
| 2008/0051599 | A1 | 2/2008 | Adami et al. |

FOREIGN PATENT DOCUMENTS

| EP | 0334154 A3 | 6/1990 |
| EP | 1921131 A1 | 5/2008 |

* cited by examiner

*Primary Examiner* — Deborah D Carr
(74) *Attorney, Agent, or Firm* — Maier & Maier PLLC

(57) ABSTRACT

The present invention provides a method of converting free fatty acid (FFA) from oil to methyl ester, the method includes the steps (a) esterifying the FFA using an acidic catalyst dissolved in an alcohol, (b) separating excess alcohol, solid acid catalyst, water, glycerol, soap and other non-lipid soluble impurities from oil obtained from step (a), (c) neutralizing the oil from step (b), (d) drying the oil from step (c) and (e) transesterifying the oil from step (d) using an alkaline catalyst and an alcohol.

16 Claims, No Drawings

METHOD OF CONVERTING FREE FATTY ACID (FFA) FROM OIL TO METHYL ESTER

RELATED APPLICATIONS

This application claims the benefit of priority under Article 1 of the Paris Convention for the Protection of Industrial Property, to Malaysian Patent Application No.: PI 20094565, filed on Oct. 29, 2009, the disclosure of which is incorporated by reference herein in its entirety.

FIELD OF INVENTION

The present invention relates to a method of converting free fatty acid (FFA) from oil to methyl ester.

BACKGROUND OF INVENTION

Production of methyl esters from fatty acids based feedstock as starting materials have been proposed as an alternative raw material for the production of methyl esters. One source of cheaper starting material is vegetable oil fatty acid distillate (FAD) e.g. palm fatty acid distillate (PFAD), soybean fatty acid distillate (SFAD) and others which is a by-product produced from edible palm oil refinery using physical refining process. Other sources of inexpensive starting materials with high FFA content include used frying oil, crops oil, sludge oil and waste oil.

FAD is traditionally used in the production of soap product, sources of feed fat, antioxidant supplement and in the animal feed industry. FAD has also been used as feedstock to recover tocopherols and tocotrienols (vitamin E). There is a promising potential production of monoglyceride using FAD. Typically, FAD contains 70-90% FFA, 10%-25% of neutral lipid and remaining 1-2% of unsaponifiable substances. Direct transesterification of such raw material with FFA more than 3% will result in high soap formation and interfere the subsequent purification of reaction mixture. The excess soap produced will inhibit the separation of the glycerol from methyl ester due to emulsion formation and resulted in low production yield.

Conventionally, esterification process is applied to feed materials with FFA higher than 3% e.g. crude palm oil and PFAD by converting the FFA into methyl ester in the presence of strong acid catalyst and alcohol prior to transesterification reaction. The strong acid catalyst such as sulphuric acid has been widely used in the esterification process. The drawback of using strong acid catalyst is the difficulties of handling and operation due to the high corrosivity of strong acid. This invention relates to the use of mild catalyst for the esterification of vegetable oil with fatty acid more than 3% e.g. bleached and/or degummed palm oil and PFAD prior to transesterification.

U.S. Pat. No. 6,965,044 discloses the esterification of acid oils or acid fats with sulphuric acid with small amount of methanol. Meanwhile, EP 0334154 discloses that the fatty acids are esterified with sulphuric acid, toluene sulphonic acid, chlorosulfonic acid and methylsulphonic acids in alcohol.

Further methods for esterification of free fatty acids are described by using different type of solid catalyst such as ion exchange resin (U.S. Pat. No. 7,256,301, EP 20070254389 and EP 1921131), strong acidic cation exchange resin followed by strong basic anion exchange resin (US 2006/0293533). US 2008/0051599 discloses an acid refined oil which is used as starting material in esterification using citric acid in alcohol.

BRIEF SUMMARY OF THE INVENTION

Accordingly, the present invention provides a method of converting free fatty acid (FFA) from oil to methyl ester, the method includes the steps of: (a) esterifying the FFA using an acidic catalyst dissolved in an alcohol, (b) separating excess alcohol, solid acid catalyst, water, glycerol, soap and other non-lipid soluble impurities from oil obtained from step (a), (c) neutralizing the oil from step (b), (d) drying the oil from step (c) and (e) transesterifying the oil from step (d) using an alkaline catalyst and an alcohol.

The present invention consists of several novel features and a combination of parts hereinafter fully described and illustrated in the accompanying description, it being understood that various changes in the details may be made without departing from the scope of the invention or sacrificing any of the advantages of the present invention.

DETAILED DESCRIPTION OF THE PREFERRED EMBODIMENTS

The present invention relates to a method of converting free fatty acid (FFA) from oil to methyl ester. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

Generally, the present invention relates to an esterification process for producing alkyl esters from high FFA raw materials in the presence of mild solid acid catalyst and a suitable amount of molar ratio of alcohol reacting with a high FFA in vegetable oil or its by-products e.g. fatty acid distillate (FAD). The mild solid acid catalyst can effectively produce alkyl esters and convert FFA at any concentration in the raw materials e.g. bleached and/or degummed oil and FAD to alkyl esters.

Particularly, the present invention method of converting free fatty acid (FFA) from oil to methyl ester, the method includes the steps of:
 (a) esterifying the FFA using an acidic catalyst dissolved in an alcohol;
 (b) separating separating excess alcohol, solid acid catalyst, water, glycerol, soap and other non-lipid soluble impurities from oil obtained from step (a);
 (c) neutralizing the oil from step (b);
 (d) drying the oil from step (c); and
 (e) transesterifying the oil from step (d) using an alkaline catalyst and an alcohol.

More particularly, the present invention provides a method of using multistage esterification process for converting FFA in a vegetable oil to produce fatty acid methyl ester (FAME) in the presence of alcohol and mild solid acid catalyst.

The vegetable oil is a vegetable oil containing FFA such as palm fatty acid distillate, soybean oil fatty acid distillate, bleached vegetable oil, bleached and degummed vegetable oil, waste oil, sludge oil, used frying oil or any combinations thereof.

The minimum amount of alcohol is required in order to forward the esterification reaction to achieve completion. Molar ratio of alcohol to FFA is of at least 1:1 based on the FFA content in the feed oils or can be higher. The alcohol used in the present invention can be selected from methanol, ethanol, iso-propyl alcohol or any combinations thereof.

The amount of the solid acid catalyst must be of at least 0.5 wt %. The solid acid catalyst can be selected from p-toluene sulphonic acid, ion resin or any combinations thereof.

The reaction kinetics of converting FFA to FAME is a function of the reaction temperature. The esterification temperature must be more than 50° C. under atmospheric condition preferably at reflux condition with extra stirring is necessary to increase the reaction rate. The reaction time can be ranging from 45 to 600 minutes.

After the reaction, the reaction mixture is separated to two phases. The top phase contains FAME, lipid and other lipid soluble components whereas the bottom phase contains excess alcohol, solid acid catalyst, water, glycerol, soap and other non-lipid soluble impurities which form a viscous and dark liquid phase.

The neutralization of the oil obtained from the above is conducted by adding alkaline solid and warm water.

The esterification reaction is repeated until FFA content has reduced to less than 2 wt % prior to further process. The final esterified product is purified by washing and drying.

The alkaline catalyst used during the transesterification step is sodium hydroxide, potassium hydroxide or any combinations thereof. If sodium hydroxide is used, then the its dosage may be in the region of 0.3 wt % to 2.0 wt %.

The transesterification step is conducted at a temperature ranging from of 50° C. to 70° C. and for a period of less than 120 minutes.

The entire process is conducted at a predetermined pressure, preferably at atmospheric condition.

Example 1

Approximately 500 g of PFAD (with FFA content of 88%) was weighed and melted at temperature of 70° C. Catalyst was prepared by dissolving 5.0 gram of ρ-toluene sulphonic acid (ρTSA) (1.0 wt % of PFAD) in 120 gram of methanol based on molar ratio of methanol and PFAD of 2:1. The mixture of ρTSA solution in methanol was added into melted PFAD. The reaction was carried out at 65° C. for 90 minutes with stirring. The reaction mixture was poured into a separating funnel and allowed to settle into two layers. The bottom layer was decanted and sample was taken from top layer to determine its FFA content. The second step esterification reaction was carried out on the top layer as method described above. During second esterification step, 1.6 gram of ρTSA (1.5 wt % of FFA in feed) was dissolved in 53 gram of methanol (based on molar ratio of 1:1 of methanol and FFA of feed). The bottom layer was drained after the reaction followed by removal of water and methanol from the top layer after. The third esterification step was carried out using 0.5 gram of ρTSA (1.0 wt % of FFA in feed), dissolved in 53 gram of methanol (based on molar ratio of 1:1 of methanol and FFA of feed) as method described above. The final ester product was purified by washing using 500 gram of warm water in order to neutralise the product. The results were shown in Table 1.

TABLE 1

Multistage Esterification of FFA in PFAD using ρ-Toluene Sulphonic Acid

|  | FFA (%) |
| --- | --- |
| Starting material | 88.0 |
| Esterification |  |
| Step 1 | 21.54 |
| Step 2 | 10.09 |
| Step 3 | 1.68 |

Example 2

Following method as described in Example 1, two steps esterification reactions were carried out using different catalyst dosage. The dosage of ρTSA (2.5 g, 0.5 wt % of PFAD, 5.0 g, 1.0 wt % of PFAD, 7.5 g, 1.5 wt % of PFAD and 10.0 g, 2.0 wt % of PFAD) was dissolved in 122 gram of methanol which based on molar ratio of methanol and PFAD is 2:1. The results were shown in Table 2.

TABLE 2

Effect of Dosage of ρ-Toluene Sulphonic Acid on the Multistage Esterification of FFA in PFAD

| Esterification reaction | Reaction parameter | | | Dosage of solid catalyst (wt %) | | | |
| --- | --- | --- | --- | --- | --- | --- | --- |
|  | Temperature (° C.) | Reaction time (min) | Molar ratio of MeOH | 0.5 | 1.0 | 1.5 | 2.0 |
|  |  |  |  | FFA (%) | | | |
| Step 1 | 65 | 600 | 2:1 | 15.09 | 9.12 | 7.12 | 5 |
| Step 2 | 65 | 75 | 2:1 | 2.19 | 2.03 | 1.65 | 0.98 (0.5 wt % of catalyst) |

Example 3

Following method as described in Example 1, the reactions were carried out at different temperatures of 50° C. and 65° C. The results were shown in Table 3.

TABLE 3

Effect of Temperatures on Multistage Esterification of
FFA in PFAD using p-Toluene Sulphonic Acid as Catalyst

| Esterification reaction | Reaction parameter | | | Temperature of reaction (° C.) | |
|---|---|---|---|---|---|
| | Dosage of catalyst (wt %) | Reaction time (min) | Molar ratio of MeOH | 50 | 65 |
| | | | | FFA (%) | |
| Step 1 | 1.0 | 600 | 2:1 | 15.24 | 9.12 |
| Step 2 | 1.0 | 120 | 2:1 | 3.22 | 1.02 |

Example 4

Following method as described in Example 1, the reaction was carried out for 45 minutes, 60 minutes, 300 minutes and 600 minutes respectively. The results were shown in Table 4.

TABLE 4

Effect of Reaction Time on the Multistage Esterification
of FFA in PFAD using p-Toluene Sulphonic Acid as Catalyst

| Esterification Reaction | Reaction parameter | | | Time of reaction (min) | | | |
|---|---|---|---|---|---|---|---|
| | Dosage of catalyst (wt %) | Temperature (° C.) | Molar ratio of MeOH | 45 | 60 | 300 | 600 |
| | | | | FFA (%) | | | |
| Step 1 | 1.0 | 65 | 2:1 | 26.7 | 25.93 | 12.71 | 9.12 |
| Step 2 | 1.0 | 65 | 2:1 | 5.82 | 1.41 | 1.03 | — |

Example 5

Following method as described in Example 1, one step esterification reaction was carried out with 500 g for bleached palm oil with FFA content was 4.6%. The reaction mixture was stirred for 75 minutes at 65° C. The results are shown in Table 5.

TABLE 5

The esterification reaction with different type of starting material

| Esterification Reaction | Reaction parameters | | | | |
|---|---|---|---|---|---|
| | Dosage of catalyst (wt %) | Time (min) | Temperature (° C.) | Molar ratio of MeOH | FFA (%) |
| Step 1 | 1.0 | 75 | 65 | 2:1 | 0.41 |

Example 6

The product from Example 1 was used to produce PFAD methyl ester using transesterification reaction. The transesterification reaction was carried out with 500 g of esterified PFAD. About 3.28 gram of odium hydroxide (0.5 wt % of esterified product) was dissolved in 244 gram of methanol (based on molar ratio of methanol and esterified PFAD of 4:1). The sodium hydroxide solution was added into esterified PFAD and reaction was carried out at 65° C. The reaction mixture was stirred for 90 minutes. The reaction product was poured into a separating funnel and allowed to settle into two layers. The bottom layer was drained and top layer was neutralised using water washing and water was removed from the final product. The results are shown in Table 6.

TABLE 6

The properties of PFAD methyl ester

| Property | Unit | PFAD Methyl Ester | EN 14214 |
|---|---|---|---|
| Ester content | % (mm−1) | 99.52 | 96.5 (min.) |
| Oxidation stability, 110° C. | hr | 18.9 | 10.2 |
| Water content | mg kg−1 | 1.2 | 500 (max.) |
| Acid value | mg KOH g−1 | 0.39 | 0.50 (max.) |
| Monoglyceride content | % (mm−1) | 0.09 | 0.8 (max.) |
| Diglyceride content | % (mm−1) | 0.01 | 0.2 (max.) |
| Triglyceride content | % (mm−1) | 0 | 0.2 (max.) |

The invention claimed is:

1. A method of converting free fatty acid (FFA) from oil to methyl ester, the method comprising the steps of:
   esterifying the FFA using a mild acidic catalyst dissolved in an alcohol;
   separating excess alcohol, solid acid catalyst, water, glycerol, soap and other non-lipid soluble impurities from oil obtained from step (a);
   neutralizing the oil from step (b);
   drying the oil from step (c); and
   transesterifying the oil from step (d) using an alkaline catalyst and an alcohol;
   wherein step (a) is repeated until the FFA content of the oil obtained from step (a) is less than 2 wt %.

2. The method as claimed in claim 1, wherein the FFA is obtained from a vegetable oil.

3. The method according to claim 2, wherein the vegetable oil is a vegetable oil containing FFA such as palm fatty acid distillate, soybean oil fatty acid distillate, bleached vegetable oil, bleached and degummed vegetable oil, waste oil, sludge oil, used frying oil or any combinations thereof.

4. The method according to claim 1, wherein step (a) is conducted for a period of between 45 to 600 minutes.

5. The method as claimed in claim 1, wherein step (c) is conducted by adding alkaline solid and warm water.

6. The method according to claim 1, wherein the reaction temperature is more than 50° C., preferably under reflux condition.

7. The method according to claim 1, wherein the acidic catalyst is an acidic solid catalyst.

8. The method according to claim 7, wherein the acidic solid acid catalyst is ρ-toluene sulphonic acid, ion resin or any combinations thereof.

9. The method according to claim 7, wherein the dosage of solid acid catalyst must be at least 0.5 wt %.

10. The method according to claim 1, wherein the alcohols used in steps (a) and (e) is methanol, ethanol, iso-propyl alcohol or any combinations thereof.

11. The method according to claim 1, wherein the amount of molar ratio of alcohol to FFA in the oil must be at least 1:1.

12. The method according to claim 1, wherein the alkaline catalyst is sodium hydroxide, potassium hydroxide or any combinations thereof.

13. The method according to claim 1, wherein step (e) is conducted using 0.3 wt % to 2.0 wt % sodium hydroxide.

14. The method according to claim 1, wherein step (e) is conducted at a temperature ranging from of 50° C. to 70° C.

15. The method according to claim 1, wherein step (e) is conducted for a period of less than 120 minutes.

16. The method according to claim 1, wherein method is conducted under atmospheric pressure.

* * * * *